United States Patent [19]

Lindsay

[11] Patent Number: 4,934,330
[45] Date of Patent: Jun. 19, 1990

[54] FUEL TANK HEATER

[76] Inventor: Keith Lindsay, 903-21st St., Monroe, Wis. 53566

[21] Appl. No.: 263,738

[22] Filed: Oct. 28, 1988

[51] Int. Cl.$^5$ ...................... F02M 31/00; F02M 31/10
[52] U.S. Cl. .................................................. 123/557
[58] Field of Search ........................ 123/557, 546, 547

[56] References Cited

U.S. PATENT DOCUMENTS

| | | | |
|---|---|---|---|
| 1,105,017 | 7/1914 | Bassford | 123/557 |
| 3,658,041 | 4/1972 | Lowry | 123/557 |
| 3,768,454 | 10/1973 | Markland | 123/557 |
| 4,343,283 | 8/1982 | Shepherd | 123/557 |
| 4,432,329 | 2/1984 | Redele | 123/557 |
| 4,440,138 | 4/1984 | Smith | 123/557 |
| 4,519,358 | 5/1985 | Redele | 123/557 |
| 4,600,825 | 7/1986 | Blazejovsky | 123/557 |
| 4,770,150 | 9/1988 | Fraenkle et al. | 123/557 |

Primary Examiner—Willis R. Wolfe
Assistant Examiner—M. Macy
Attorney, Agent, or Firm—Malin, Haley, McHale, DiMaggio & Crosby

[57] ABSTRACT

The invention utilizes a closed-loop type fuel heating system which will simultaneously and continuously heat the diesel fuel in both tanks as found on all tractor trailers. The purpose of heating the diesel fuel is to prevent fuel clouding, waxing and ice formation in the fuel lines. Waxing is known to cause sticking of the fuel injectors. Appropriate valving and a control switch are included in the system to permit the heating system to be turned off in the warmer months when there is no possibility of the ambient temperature falling below thirty-two degrees Fahrenheit. Additionally, appropriate valving is provided to permit the heating source to be cut-off in the event that a leak in the heat exchanger should develop. In order to withstand the effects of vibrating, applicant has provided a multi-coil heat exchanger made of stainless steel.

9 Claims, 1 Drawing Sheet

FUEL TANK HEATER

BACKGROUND OF THE INVENTION

As is well known by anyone who has owned or driven a vehicle with a diesel engine, whether it be auto, pick-up or large eighteen wheeler, cold weather reduces the viscosity of diesel fuel. Since all diesel engines, regardless of size, are of the injected fuel type, cold weather automatically produces injector problems resulting from the reduced temperature of the diesel fuel.

Some of the problems which occur in diesel engines at reduced temperatures are fuel clouding, waxing and ice formation in the fuel lines, fittings and injectors. Waxing usually results in sticking injectors which will significantly reduce the performance efficiency of the engine. The effects of water or moisture droplets freezing in a fuel line can have an even more drastic effect on engine performance. If the concentration of water or moisture in the diesel fuel is sufficiently high, it will result in these droplets freezing and thus blocking the fuel lines, bringing the engine to a halt.

In view of the above known facts, there has been a considerable amount of research and development directed at this serious problem. For example, separators have been utilized to absorb moisture in the fuel lines and thus reduce the possibility of icing in the fuel lines. In addition, a variety of fuel heaters have been developed. However, none of the known fuel heating systems have been able to bring about an acceptable solution to the above noted problem. A known heating system utilized a heat exchange tube in the fuel tank with the heat exchange tube being connected to the engine's cooling system. After a period of time, such systems have been known to develop a fracture of the heat exchange tube in the fuel tank, thus contaminating the diesel tank with a mixture of water and antifreeze.

Another known system uses an in-line heat exchanger after the diesel fuel has left the tank and is on its way to the injector manifold. The problem with this type of system was the fact that the heat exchanger only heated the diesel fuel after it left the tank. Thus any water or moisture droplets which are in the tank or tanks can freeze resulting in blockage of the lines.

SUMMARY OF THE INVENTION

It was with the knowledge of the above noted facts that applicant was motivated to develop a system which would overcome these problems and satisfy the problems associated with diesel engines in low temperature environments. For purposes of this disclosure, "low temperature", is considered to mean any temperature below thirty-two degrees Fahrenheit.

The system that applicant has developed does not in any way interfere with the conventional cooling system of the engine. Additionally, the instant invention utilizes a closed-loop type fuel heating system which will simultaneously and continuously heat the diesel fuel in both tanks. Appropriate valving and control switch are included in the system to permit the heating system to be turned off in the warmer months when there is no possibility of the ambient temperature falling below thirty-two degrees Fahrenheit. Additionally, appropriate valving is provided to permit the heating source to be cut-off in the event that a leak in the heat exchanger should develop. Although this is only a remote possibility, appropriate valving has been provided to help cope with such a problem. In order to reduce the possibilities of failure of the heat exchanger, applicant has utilized a stainless steel coil which can withstand the vibrating effects of prolonged driving.

The novel system includes an electric pump which is continuously taking suction from both diesel fuel tanks, passing it through the heat exchanger and then directing a portion of the heated diesel fuel back to each of the two diesel fuel tanks.

OBJECTS OF THE INVENTION

An object of the invention is the provision of a fuel heater system which does not interfere with the normal fuel delivery system.

A further object of the invention is the provision of a fuel heater system which simultaneously heats fuel from both fuel tanks.

Another object of the invention is the provision of a fuel heater which utilizes a stainless steel heat exchanger coil.

A still further object of the invention is the provision of a fuel heater system that is provided with appropriate valving to close the system down in the event of a leak.

Yet another object of the invention is the provision of a system which utilizes its own pump to circulate the fuel.

These and other objects of the instant invention will become more apparent hereinafter. The instant invention will now be described with particular reference to the accompanying drawings which form a part of this specification wherein like reference characters designate the corresponding parts in the several views.

DETAILED DESCRIPTION OF THE DRAWINGS

Figure 1:
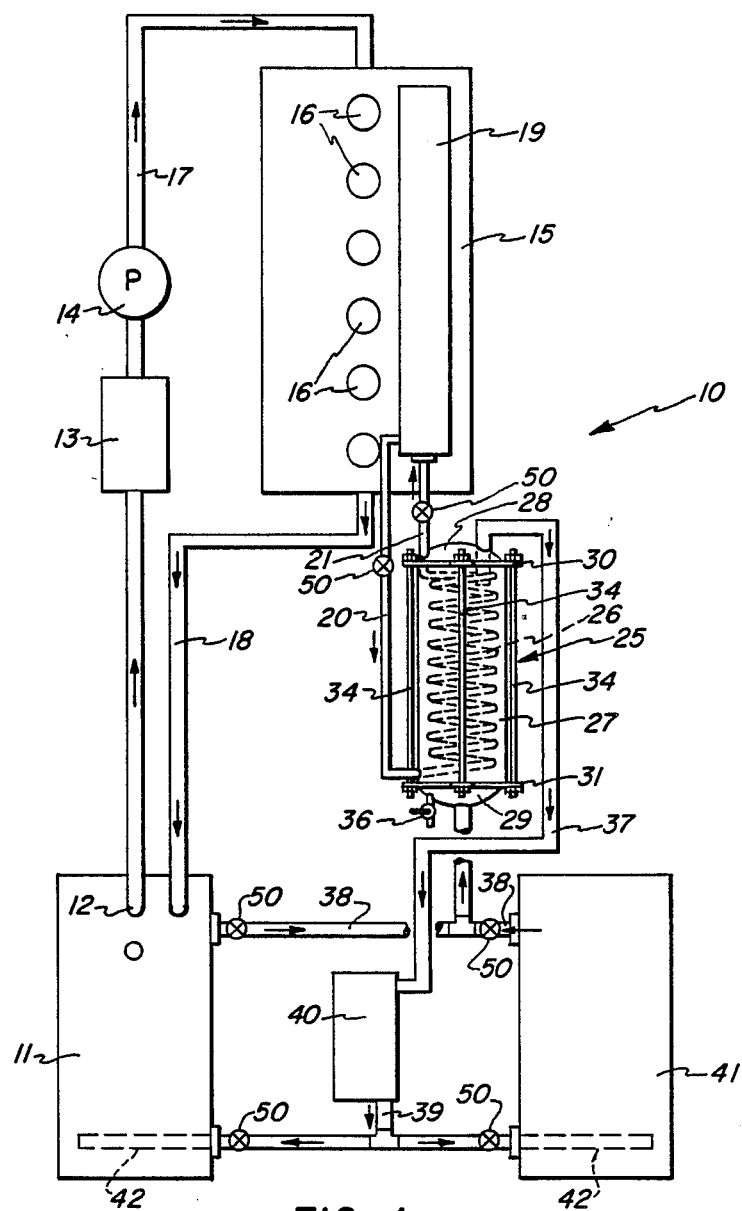
FIG. 1 is an overall plan view showing how the fuel heater is interconnected with a conventional diesel engine fuel system utilizing two diesel fuel tanks.

Referring now to FIG. 1, there is shown an overall plan view of a conventional diesel engine fuel system generally indicated by reference numeral 10. As can be seen in this FIG. 1, diesel engine 15 is provided with a plurality of fuel injectors 16 which receive diesel fuel from tank 11 via engine pick-up tube 12. Fuel from pick-up tube 12 is delivered to fuel filter 13 where contaminants are removed and then passed to the suction side of fuel pump 14. Fuel pump 14 discharges diesel fuel into supply line 17, which delivers the diesel fuel to injectors 16. As is common in fuel systems of this type, the unused diesel fuel is returned to tank 11 by return line 18. Engine 15 is also provided with a hot water cooling manifold 19 that provides the heating fluid for fuel heater 25. Hot water supply line 20 leads from cooling water manifold 19 to the bottom of fuel heater 25 where it is connected to stainless steel coil 26. The uppermost end of coil 26 is connected to return line 21 then back to manifold 19. Hot water from the hot water cooling manifold 19 flows through supply line 20, through stainless steel coil 26, and then back to manifold 19 through return line 21.

Fuel heater 25 comprises a cylindrical section 27 which is open at its upper and lower ends. Stainless steel coil 26 is mounted inside of cylindrical section 27 and appropriate connections are made to supply line 20 and return line 21. Surrounding coil 26 is a centrally located retainer member not shown which absorbs vibration from the engine. An upper and lower domed cover 28 and 29, respectively, is placed over the upper and lower ends of cylindrical section 27. An upper and lower clamping member, 30 and 31, respectively, are placed over upper and lower domed covers 28 and 29. Each of the clamping members, 30 and 31, are provided with four ears 32 having an aperture 33 therein. Tension rods 34 are inserted through apertures 33 in ears 32 after clamping members 30 and 31 have been placed over the respective domed covers 28 and 29. It is to be noted that the diameter of central openings 35 in clamping members 30 and 31 is sufficiently smaller than the outermost diameter of domed covers 28 and 29 to force covers 28 and 29 into close contact with cylindrical section 27 and thus prevent any leaking. Lower domed cover 29 is provided with a drain petcock 36 for periodically draining any sediment which might collect in the lower domed cover 29.

Diesel fuel is drawn from both tank 11 and tank 41 simultaneously by electric fuel pump 40 which is fluidly connected with the upper portion of fuel heater 25 by suction line 37. Lower domed cover 29 is fluidly connected to the bottom of fuel tanks 11 and 41 by lines 38. Suction is taken from the bottom of tanks 11 and 41 since that is where the colder fuel has settled. After the fuel from suction line 37 has passed through electric pump 40 it is discharged into discharge line 39 and then branches back into tanks 11 and 41 by means of extension tube 42 which are positioned near the bottom thereof.

As can be seen from FIG. 1, the novel fuel heater system 10 does not interfere with the engine's normal fuel system. With respect to fuel heater system 10 appropriate valves 50 have been provided to close-off the fuel tanks 11 and 41 and also the cooling manifold 19 in the event that repairs may be required. Additionally, a switch (not shown) is provided in the cab of the tractor whereby the driver can actuate the fuel heating system 10, if he so desires. Obviously, all valves 50 must be in their "open" position for the system to operate.

Figure 2:
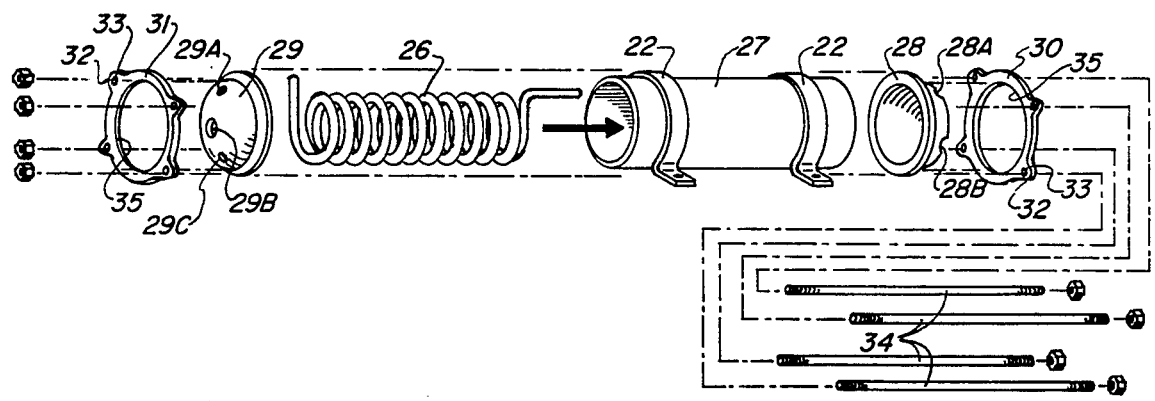
FIG. 2 is an exploded view of the fuel heater per se illustrating the various components.

Referring now to FIG. 2, there is illustrated, in exploded fashion, the various components of fuel heater 25. On the leftmost side of FIG. 2 is illustrated cylindrical section 27, as indicated previously it is open at its upper and lower ends. Clamps 22 are shown surrounding cylindrical section 27 and are used for mounting heater 25 to a convenient location in the engine compartment. Immediately to the left of cylindrical section 27 is the stainless steel coil 26. As shown coil 26 comprises a plurality of coils. The cross-section of a coil portion is one-half inch in diameter. The total length of the coils is approximately twenty-two feet thus presenting a total heating surface of approximately 414 square inches of heat exchanger surface. Thus, it can readily be seen that a significant amount of heat can quickly and efficiently be transferred to the diesel fuel within cylindrical section 27 as it surrounds heating coil 26. As pointed out above, coil 26 is made of stainless steel which is highly resistant to corrosion.

To the right and left of coil 26 are upper and lower clamping members 30 and 31, respectively. These are the members which apply the necessary sealing force to domed covers 28 and 29 to prevent any leakage.

Next, tension rods 34 are illustrated. Rods 34 are inserted through apertures 33 in ears 32 of clamping members 30 and 41. Nuts are threaded onto the upper and lower ends of tension rods 34 to apply the tensioning force thereto.

To the right of tension rods 34 are upper and lower domed covers 28 and 29, respectively. Upper domed cover 28 is provided with a pair of openings 28A and 28B for the outlet of coil 26 and suction line 37. Lower domed cover 29 is also provided with three openings 29A, 29B and 29C, for the petcock drain 36, inlet line 38 to the heater 25, and connecting line 20 to heating coil 26.

While the invention has been described in its preferred embodiment, it is to be understood that words which have been used are words of description rather than limitation and that changes may be made within the purview of the appended claims without departing from the full scope or spirit of the invention.

Having thus described my invention, I claim:

1. A diesel fuel heater kit for attachment to a diesel engine, said kit comprising:

a cylindrical heat transfer housing member having heat exchange means mounted therein; first conduit means for fluidly interconnecting the fuel tanks of said diesel engine with said cylindrical housing member; second conduit means for fluidly interconnecting said heat exchange means with the engine cooling system of said diesel engine for indirect heat exchange between said diesel fuel and the exhaust heat of said diesel engine; third conduit means for returning heated diesel fuel to said fuel tanks from said heat exchange means, and pump means for circulating said diesel fuel from said fuel tanks, through said heat exchange means, and back to said fuel tanks, and fourth conduit means, independent of said first, second or third conduit means, fluidly communicating said fuel tanks with said diesel engine.

2. A fuel heater kit as set forth in claim 1 wherein said heat exchange means comprises a heating coil centrally located within said cylindrical heat transfer housing member and connectable to the cooling system of the diesel engine; pump means for forcing diesel fuel through said fuel heater kit.

3. A fuel heater kit as set forth in claim 1 wherein a plurality of control valves are provided to control the exhaust heat flowing from said engine cooling system through said heat exchanger means and to control the flow of diesel fuel to and from said diesel fuel tanks.

4. A system for maintaining diesel fuel for use in connection with an internal combustion engine at an elevated temperature in cold climates, comprising:

a fuel delivery system having:
 fuel tank means,
 first delivery means fluidly communicating said fuel tank means with said internal combustion engine;
 first return means fluidly communicating said internal combustion engine with said fuel tank means for unused fuel to be returned to said fuel tank means;
 means to circulate fuel within said fuel delivery system, that is from said fuel tank means through said first delivery means to said internal combustion engine, and then to circulate any fuel not used by said internal combustion engine through said first return means to said fuel tank means;
fuel heating means, having:

heat transfer means for exchange between said fuel and heat from an external source of heat;

conduit means fluidly communicating said heat transfer means with heat from said external source of heat;

second delivery means, fluidly independent of said first delivery means and said first return means, fluidly communicating said fuel tank means with said heat transfer means;

second return means, fluidly independent of said first delivery means and said first return means, fluidly communicating said heat transfer means with said fuel tank means; and means to circulate said diesel fuel through said heat transfer means via said second delivery means and said second return means.

5. The system of claim 4 wherein said external source of heat is exhaust heat from said engine.

6. The combination as set forth in claim 4 wherein said diesel fuel tank means comprises a pair of diesel fuel tanks, said fuel tanks being fluidly connected to each other via said second delivery means.

7. The combination as set forth in claim 4 wherein said second delivery means and said second return means are each provided with means to regulate the flow of said heated fluid and fuel to and from said engine cooling system and said fuel tanks respectively, said means to regulate the flow of said heated fluid being controllable by the operator of said internal combustion engine.

8. The combination as set forth in claim 6 wherein said second delivery means relative to each fuel tank are interconnected in such a manner that fuel is drawn from both fuel tanks simultaneously.

9. The combination as set forth in claim 8 wherein said second delivery means draws fuel from the bottom of said pair of diesel fuel tanks where the colder fuel resides.

* * * * *